United States Patent [19]
Adam

[11] Patent Number: 4,726,514
[45] Date of Patent: Feb. 23, 1988

[54] HEATING DEVICE

[75] Inventor: Willibald Adam, Ottobrunn, Fed. Rep. of Germany

[73] Assignee: Webasto-Werk W. Baier GmbH & Co., Gauting, Fed. Rep. of Germany

[21] Appl. No.: 863,459

[22] Filed: May 15, 1986

[30] Foreign Application Priority Data

May 18, 1985 [DE] Fed. Rep. of Germany ....... 3517954

[51] Int. Cl.$^4$ ............................................ G05D 23/00
[52] U.S. Cl. .................................. 237/2 A; 236/21 R
[58] Field of Search ............ 237/2 A, 12.3 A, 12.3 B, 237/8 R; 236/91 F, 1 A, 20 B, 20 R, 21 R, 21 B; 431/16

[56] References Cited

U.S. PATENT DOCUMENTS

| | | | |
|---|---|---|---|
| 2,602,591 | 7/1952 | Wilson et al. ................. | 236/91 F X |
| 2,689,932 | 9/1954 | Hornfeck ...................... | 236/91 F X |
| 3,847,350 | 11/1974 | Thompson ....................... | 236/21 B |
| 4,497,438 | 2/1985 | Bonne .................................. | 237/8 R |

FOREIGN PATENT DOCUMENTS 25592 10/1983 European Pat. Off. ............ 237/2 A
1931251 1/1966 Fed. Rep. of Germany ..... 237/2 A Primary Examiner—Henry A. Bennet
Attorney, Agent, or Firm—Sixbey, Friedman & Leedom

[57] ABSTRACT

A heating device, particularly an auxiliary vehicle heating device, in which there are disposed, a first temperature sensor at the inlet, and a second temperature sensor at the outlet of the heating device. The outputs of the two temperature sensors are connected with a circuit, so that the operating condition of the heat exchanger of the heating device can be constantly monitored. For the purpose of early detection of a tendency towards overheating of the heating device, appropriately, the temperature differential between the two temperature sensors is determined, and, based upon a predetermined threshold value, the heating device is turned off, if necessary, in order to prevent resultant damage. The outputs of the temperature sensors can also be integrated with a control unit for the performance of control functions and, based upon different switch points, control operation of the vehicle blower, the heating output, and/or the heat exchanger temperature.

19 Claims, 4 Drawing Figures

HEATING DEVICE

The invention relates to a heating device, particularly to an auxiliary heating device for vehicles.

In such auxiliary vehicle heating devices the heating medium may be water or air. In the first case, such devices are referred to as water heating devices and in the second case as air heating devices. They respectively have a control element for controlling the operating conditions of the device, which element, in a given case, can also operate the heating device during varying performance phases, dependent upon heat requirements.

German GM No. 19 31 251 discloses a vaporizing oil burner having a safety ignition device and a control element. There is a thermostat in the feed line of the heating plant, and an additional thermostat, serving as a temperature sensor, is provided in the chamber to be heated. The thermostats can produce a reduction of the oil quantity regulator to a lower output stage as well as a reduction of the rotational speed of the blower. When the heat produced in the vaporizing oil burner exceeds the heat required, the heating plant is turned off via the input line thermostat. After a certain interval, if there is a subsequent heat requirement, the vaporizing oil burner is automatically reignited.

European patent No. 25,592 discloses an air conditioning device for vehicles in which a mixture of outside air and inside air is controlled via several temperature sensors in the vehicle interior and in the individual units of the air conditionning system in connection with a control element in the form of a computer device, like a microprocessor.

In all of these conventional plants, there is a minimum of one additional temperature sensor (i.e., a sensor in addition to the temperature sensors in the chamber to be heated) to provide control of the heating plant and/or the air conditioning device in a corresponding manner. Such controls, in connection with room (space) temperature sensors, however, present difficulties, particular in vehicles when, for instance, a window and/or sliding roof or other ventilating means are opened. The governing factor for the accuracy of the control provided is, in each case, the location of the temperature sensor influencing the controls. This factor is also the cause for premature response of a safety device concerning temperature load capacity of the plant.

In order to protect the heat exchanger from overheating, temperature safeguard controls are customary, which however, only respond once their is a state of overheating, and which, moreover, have high response tolerances.

It is the objective of the invention to provide a heating device which overcomes the above problems and facilities reliable and accurate control of the operating conditions, thereby offering dependable and effective overheating protection, with a minimum number of sensors. The invention also provides that additional control functions can be performed by the sensors.

The heating device of the invention is characterized in that a first temperature sensor is arranged at the inlet, and a second temperature sensor is arranged at the outlet of the heating device, and is further characterized in that the output of the two temperature sensors are connected with a control mechanism in such a way that the operating performance of the heat exchanger is constantly monitored, particularly with regard to the thermal load. The heat flow through the heating device from entrance to exit is determined by way of the two temperature sensors, so that operating conditions which may lead to an overheating of the device can be quickly detected. Any tendency to overheat can be recognized in the inventive heating device before an actual overheating condition occurs, permitting the device to be turned off without damage thereto. Thus, it is an objective of the invention to provide an effective protection from overheating without regard to its causes, which may be manifold in nature. Due to its special design, the inventive heating device has intrinsic and temperature safeguards which do not require its components to have large response tolerances due to the continuous monitoring of the heat flow by the two temperature sensors.

Appropriately, the temperature differential between the two temperature sensors is ascertained to form the basis for the determinitive criterion for controlling the heat exchanger's operating condition, and further, if appropriate, is placed into a time reference frame, permitting easy determination and detection of the heat exchanger's operating conditions. This differential temperature figure is compared with at least one predetermined threshold value which has been selected so that the heating device is turned off before it reaches a state of overheating.

In accordance with another embodiment of the invention, the output of the temperature sensors is supplied to a control unit for performance of the control function which determines the operatng sequence and functioning of the heating device. In a further development of the invention, a number of control and monitoring functions can be achieved by means of the temperature values at the two temperature sensors.

In still another development of the invention, if varying switching points are specified, based upon the temperatures detected by the sensors, switching of the vehicle blower, control of the heating output, and in a given case, control of the temperatures in the space to be heated, e.g., the passenger compartment of a motor vehicle, is facilitated. Thus, the temperature sensors provided, in accordance with the invention, permit self-control of the operating sequence of the heating device without resorting to additional means, e.g. a blower thermostat for switching the vehicle blower.

Considering the differential between the two temperature sensors and based upon a preset temperature value of at least one temperature sensor, control of the heat output performance is facilitated, whereby the heating device may, in a given case, be switched from a partial load range to a full load range, or vice versa. This permits operation of a heating device, based on heat requirements, by merely using the two temperature sensors.

In a further embodiment of the invention, the two temperature sensors can additionally be utilized to monitor the flame in the heating device by considering the temperature differential in the control unit. When the temperature differential, after a predetermined time of several seconds, is not larger by a predetermined amount than that at the start-up of the heating device, the cause may be that the heating device has failed to ignite.

On the other hand, the two temperature sensors also permit consideration of the temperature differential by the control device when the control is switched off.

If, for example, after a predetermined time of several seconds, the temperature differential between the inlet and the outlet is decreasing, and/or the temperature at the outlet equals the temperature at the inlet, the blowers or other units of the heating units can be switched off.

In a further embodiment of the invention, the two temperature sensors permit the realization of safety functions, like temperature safeguards and safeguards for the heating device itself, in the event that the temperature differential leads to inadmissible values. In the event of such a malfunction, the heating device is switched off, and an indication of the malfunction is registered via the control unit, which can be cleared by unlocking. Accordingly, temperature safety and safety monitoring of the heating device do not require separate devices, but can be performed by the control elements in conjunction with the temperature sensors.

The inventive concept is applicable to air heating as well as water heating devices, and accordingly finds a wide range of application.

When the heating device is a water or an air heating device, i.e., utilizes water or air, respectively, as the heating medium, the temperature sensors are disposed at the inlet or in the immediate proximity thereof, and at the outlet or in the immediate proximity thereof, in order to ensure a temperature recording at the inlet and outlet sides of the device which is as distortion-free as possible.

These and further objects, features and advantages of the present invention will become more obvious from the following description when taken in connection with the accompanying drawings whch show, for purposes of illustration only, several embodiments in accordance with the present invention.

DETAILED DESCRIPTION OF THE PREFERRED EMBODIMENTS

Figure 1A:
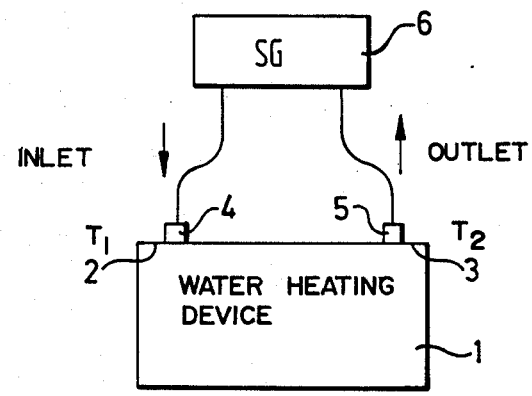
FIGS. 1a and 1b are diagrammatic views, respectively, of water and air heating devices, in accordance with the invention.
Figure 1B:
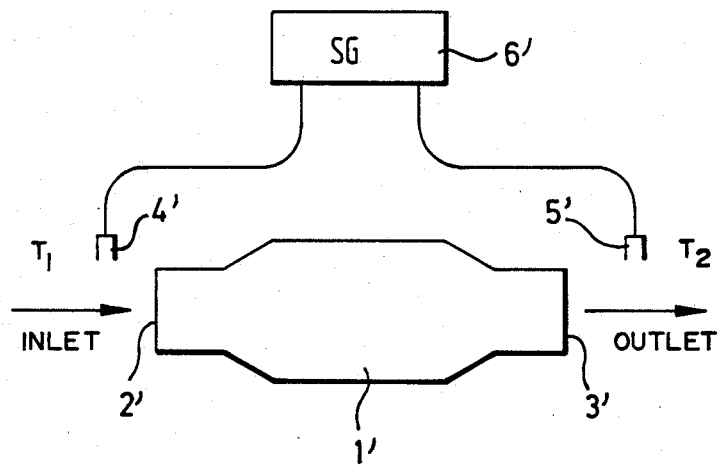

FIGS. 1a and 1b are schematic illustrations of two basic embodiments of a heating device which finds particular application as a vehicle auxiliary heating device.

FIG. 1a schematically shows a water heating device, in accordance with the invention, designated generally with reference numeral 1. Details pertaining to its interior construction have been eliminated for reasons of graphic clarity and are conventional, per se (see, e.g., U.S. Pat. No. 4,543,943). In such a water heating device, water is used as a liquid heat exchange medium, whereby a heat exchanger transfers the heat of the hot combustion gases to the water, which enters water heating device 1 via inlt 2 and exits via outlet 3. In accordance with the invention, a first temperature sensor 4 is provided in water inlet 2, and a second temperature sensor 5 is provided in water outlet 3. Temperature sensors 4 and 5 are linked with each other by circuit 6 (depicted in block form) of a control unit, via their outputs, such that the operating condition of the heat exchanger of heating device 1 can be constantly monitored.

In order to ensure a reliable and accurate detection of the operating condition of the heat exchanger, circuit 6, for instance, determines the temperature difference between temperature sensor 4 and 5, in a given case, further converts such value into a time/rate relation reflecting, e.g., the rate of charge of the temperature differential with respect to time. Furthermore, circuit 6 can be designed such that it makes a comparison with a preset threshold value which, for example, is selected to specify an appropriate temperature safety limit and, when such limit is exceeded, switches off the heating device 1 before a state of overheating occurs. In order to ensure safe monitoring of the heating device, it is preferred that two threshold values are predetermined. If, subsequently, the temperature differential value ascertained is above such threshold value, the connecting line of temperature sensor 5 at outlet 3 of the heating device can be interrupted, or the temperature sensor 4 in inlet 2 of heating device 1 can be short-circuited. In this manner, the inventive arrangement of temperature sensors 4, 5 also is constantly functionally monitored.

In some instances, the temperature differential may even assume a negative value, i.e. in cases where the temperature sensor 4, in inlet 2 of the device, or in its connecting line, respectively, is interrupted; or when temperature sensor 5 in outlet 3 of heating device 1 is short circuited. A negative temperature differential can also be the result of the absence of water flowing through water heating device 1. Any of these possible circumstances can be detected and monitored by the unique design of the inventive heating device and permit corresponding counter measures to be initiated, thereby avoiding critical operating conditions of the device and damage resulting therefrom.

FIG. 1b schematically depicts an air heating device 1' in which the heat of the hot combustion gases is transferred by a heat exchanger to the air, serving as the heat exchanger medium. The heater details (burner, blower, etc.) are, again, conventional, per se and have not been illustrated since such structures can be found with reference to existing patents (see, e.g., U.S. Pat. No. 4,519,772). Identical or similar parts in FIG. 1a have the same reference numerals in FIG. 1b with the addition of a "'" symbol. Circuit 6' essentially has the same task and functional mode as circuit 6 in FIG. 1a, and, therefore, does not require further detailed discussion, apart from noting that, in this case, tempeature sensors 4', 5' are disposed at, or in the immediate proximity of, inlet 2' and outlet 3' of heater 1'.

Figure 2A:
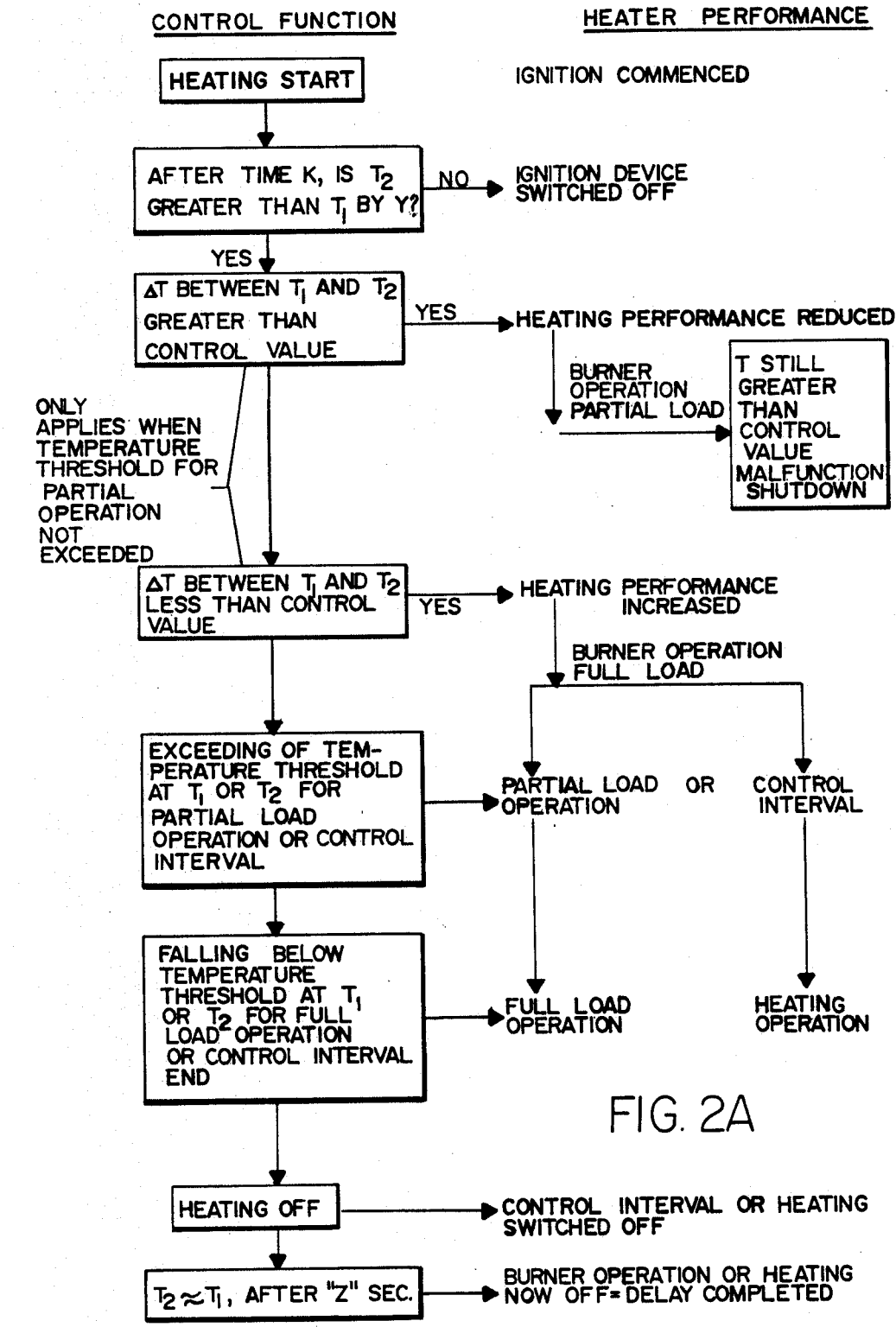
FIGS. 2A, 2B are flow diagrams for illustrating the functional mode of the inventive heating devices.
Figure 2B:
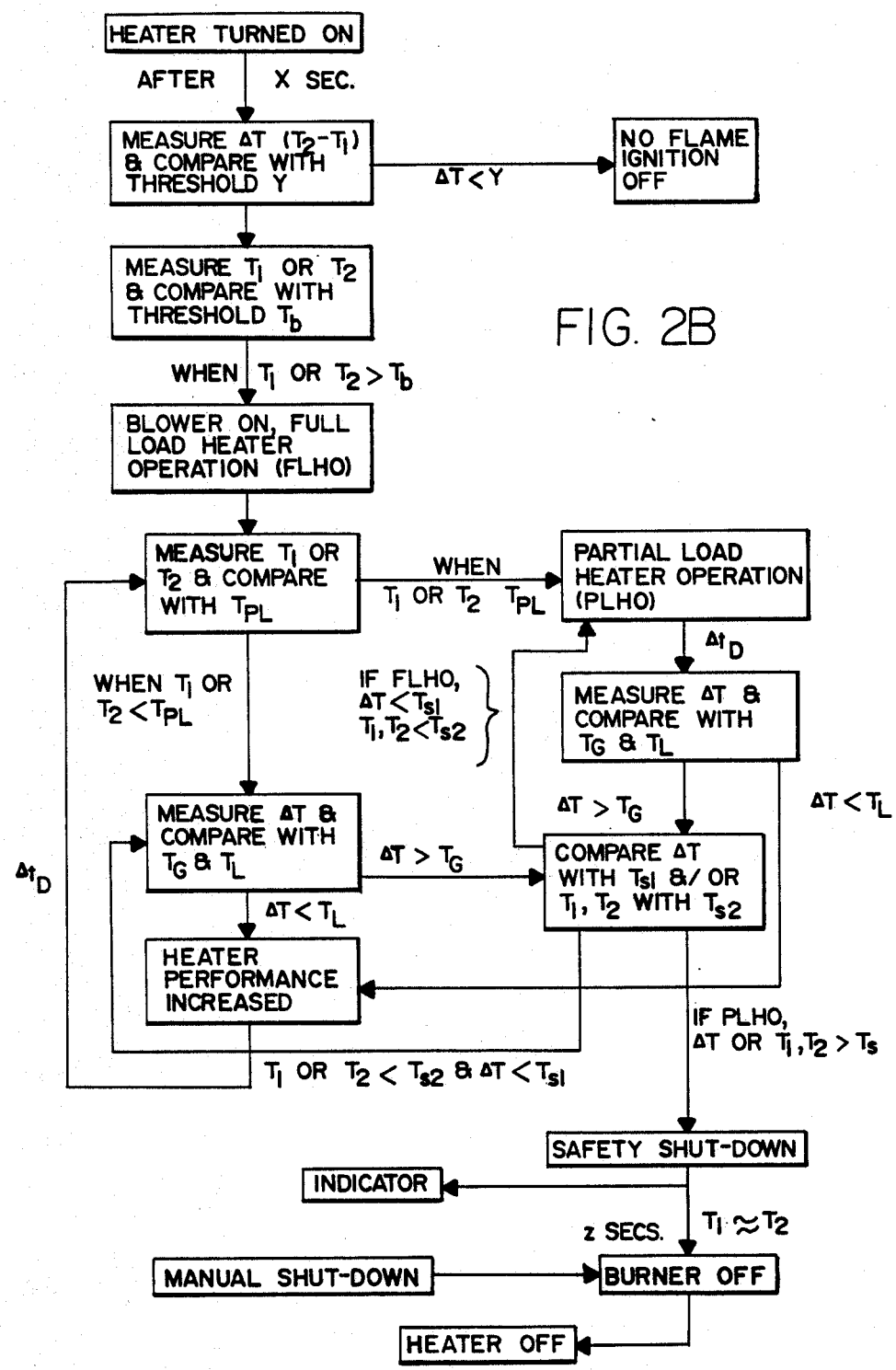

The flow diagram according to FIG. 2 illustrates the functional sequence of heating device 1 or 1', respectively. The illustration of this functional sequence shows that the two temperature sensors 4, 5 or 4', 5' are connected with a control unit of heating device 1, 1' in order to perform corresponding control functions in heating device 1, 1' based upon the temperatures sensed by the temperature sensors.

First, heating device 1, 1' is switched on. After an initial time period k, for purposes of flame monitoring, the temperature differential $\Delta T$ between the temperature $T_1$ detected by sensors 4, 4' and inlet 2, 2' and the temperature $T_2$ sensed at outlet 3, 3', is determined. If the temperature $T_2$ sensed at outlet 3, 3' by sensors 5, 5', within a predetermined time "x" seconds, is not higher by a predetermined value "y" than temperature $T_1$ at inlet 2, 2', the ignition device of heating device 1, 1' is switched off, since failure to achieve such a $\Delta T$ value is an indication that a flame has not developed in the combustion chamber of heating device 1, 1'. If, however, temperature $T_2$, after the predetermined time of "x"

seconds, is higher than temperature $T_1$, combustion operation has commenced within heating device 1, 1'.

When temperature $T_1$ at inlet 2, 2' or $T_2$ at outlet 3, 3' of heating device 1, 1' is greater than a predetermined threshold value $T_b$, the blower, for instance, is switched on. The heating device then performs in full load range.

When a temperature threshold value $T_{PL}$ for the partial load operation of the heating device 1, 1' is not exceeded, heating performance also can be controlled by means of temperature sensors 4, 5, 4' 5'. For such control, a set value is specified. If now the temperature difference $\Delta T$ between the sensors is greater than a specified set value $T_G$, heating performance is reduced and there is a reversal from full load operation to partial load operation. If, however, the sensed temperature difference $\Delta T$ is smaller than the specified set value $T_L$, heating output is increased, and if the heating device has operated in partial load range for a control interval time $t_D$, there is a reversal to full load operation. If the threshold value $T_{S1}$ for the temperature safeguard is exceeded in comparison with the temperature differential $\Delta T$ between the two temperature sensors 4, 5 or 4', 5', a forced switch-off of the heating device 1, 1' occurs, as this is an indication of an operational disturbance.

If the preset temperature threshold value is exceeded in the reversal from partial load operation to full load operation, or, in a given case, is exceeded for a time interval in the heating output control, i.e., by temperature $T_1$ at inlet 2, 2', or temperature $T_2$ at outlet 3, 3' of heating device 1, 1', by utilization of temperature sensors 4, 5 or 4', 5', either a shut down control interval $t_{SD}$ is introduced, or there is a reversal from a full load operation to a partial load operation.

If further, a temperature threshold value $T_{S2}$ is preset for full load operation, or for a control interval, by utilizing the two temperature sensors, the heating device can continue operation in full load in the event that the temperature falls below the threshold value, either by temperature $T_1$ at inlet 2, or by temperature $T_2$ at outlet 3.

Finally, heating device 1, 1' is turned off upon completion of the heating operation, or after a control interval.

Appropriately, when switching off heating device 1, 1', there is a time delay for deenergizing and for the dissipation of the residual heat, whereby the blower is permitted to run with the burner off. By utilizing the two temperature sensors 4, 5 or 4', 5', this delay is completed when temperature $T_1$ is approximately equal to temperature $T_2$ or after a preset time period of approximately "z" seconds, whereupon the heating device becomes inoperative.

If, for instance, a threshold value specified for the emergency shut-down, which is compared with the temperature differential between the output of the two temperature sensors 4, 5 or 4', 5', is either exceeded or underachieved, a malfunction indicator can also be activated to bring such disturbance to the attention of the operator of the heating device 1, 1'.

It is to be understood that the sensed data of the two temperature sensors 4, 5, 4', 5' can also be correspondingly processed by using a microprocessor whose outputs control the corresponding units of the heating device.

While not restricting the invention to the examples described, it is advisable that at least one of the temperature sensors be disposed at a locatio of the heating device which has proven to undergo the strongest thermal stress.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Heating device, particularly an auxiliary vehicle heating device, comprising an inlet, a heat exchanger through which a heat exchanger medium is passed and a control unit for controlling the operation of the heating device, wherein a first temperature sensor is disposed in proximity to an inlet of the heat exchanger for the heat exchange medium and a second temperature sensor is disposed in proximity to an outlet of the heat exchanger for the heat exchange medium, and wherein outputs of said temperature sensors are linked with a circuit means of said control unit for constantly monitoring the operating condition of the heat exchanger and for detecting the occurrence of operating conditions which may lead to overheating of the heating device, said control unit being responsive to detection of a potential overheating causing condition by said circuit means for changing the operation of the heating device in a manner acting to prevent the actual occurrence of an overheating condition.

2. Heating device according to claim 1, comprising means for determining a temperature differential existing between the respective temperatures sensed by the temperature sensors and for controlling the operating condition of the heat exchanger as a function of said temperature differential.

3. Heating device according to claim 2, comprising means for comparing the outputs of the temperature sensors with at least one preset threshold value.

4. Heating device according to claim 3, wherein at least one of a vehicle blower speed, the heat output of a burner of the heating device, and the temperature of the heat exchange medium are controlled by the control unit via the temperature sensors based upon respective switch points.

5. Heating device according to claim 2, comprising means for effecting a change in heating performance of the device in response to a temperature value sensed by at least one of said temperature sensors.

6. Heating device according to claim 3, comprising means for effecting a change in heating performance of the device in response to a temperature value sensed by at least one of said temperature sensors.

7. Heating device according to claim 4, wherein the control unit is operable for evaluating the temperature differential at the two temperature sensors on a time dependent basis, for performing at least one of flame monitoring and switch-off functions.

8. Heating device according to claim 2, wherein the control unit is operable for evaluating the the temperature differential at the two temperature sensors on a time dependent basis, for performing at least one of flame monitoring and switch-off functions.

9. Heating device according to claim 8, wherein switch-off means is associated with the control unit for switching off the heating device upon determination of a malfunction on the basis of the temperature differential and wherein means is provided for producing an indication of the malfunction.

10. Heating device according to claim 7, wherein switch-off means is associated with the control unit for switching off the heating device upon determination of a malfunction on the basis of the temperature differential and wherein means is provided for producing an indication of the malfunction.

11. Heating device according to claim 2, wherein switch-off means is associated with the control unit for switching off the heating device upon determination of a malfunction on the basis of the temperature differential and wherein means is provided for producing an indication of the malfunction.

12. Heating device according to claim 1, wherein the heating device is a water heating device and the temperature sensors are disposed, respectively, in a water inlet and a water outlet to the heat exchanger.

13. Heating device according to claim 2, wherein the heating device is a water heatng device and the temperature sensors are disposed, respectively, in a water inlet and a water outlet to the heat exchanger.

14. Heating device according to claim 3, wherein the heating device is a water heating device and the temperature sensors are disposed, respectively, in the water inlet and a water outlet to the heat exchanger.

15. Heating device according to claim 10, wherein the heating device is a water heating device and the temperature sensors are disposed, respectively, in a water inlet and a water outlet to the heat exchanger.

16. Heating device according to claim 1, wherein the heating device is an air heating device and the temperature sensors are disposed, respectively, in the vicinity of an air inlet and an air outlet of the heating device.

17. Heating device according to claim 2, wherein the heating device is an air heating device and the temperature sensors are disposed, respectively, in the vicinity of an inlet and an air outlet of the heating device.

18. Heating device according to claim 3, wherein the heating device is an air heating device and the temperature sensors are disposed, respectively, in the vicinity of an air inlet and an air outlet of the heating device.

19. Heating device according to claim 1, wherein said first and second temperature sensors are the only condition sensors linked with circuit means for controlling the operation of the heating device so as to render said circuit means directly responsive to only said temperature differential.

* * * * *